United States Patent
Hamamoto et al.

(10) Patent No.: US 6,311,243 B1
(45) Date of Patent: Oct. 30, 2001

(54) RESERVATION OF TRANSMISSION BANDWIDTH AND CHANNEL RESERVATION FOR IEEE 1394 BUS

(75) Inventors: Yasuo Hamamoto, Sakai; Hidetoshi Takeda, Neyagawa, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/203,836

(22) Filed: Dec. 2, 1998

(30) Foreign Application Priority Data

Dec. 4, 1997 (JP) .................................. 9-334326

(51) Int. Cl.⁷ .......................... G06F 13/00; H04B 7/212; H04L 12/43
(52) U.S. Cl. ......................... 710/107; 370/443; 370/458
(58) Field of Search .................... 370/431–473; 710/107–130

(56) References Cited

U.S. PATENT DOCUMENTS

| | | | | |
|---|---|---|---|---|
| 4,845,705 | * | 7/1989 | Dorgelo ............................... | 370/371 |
| 4,891,805 | * | 1/1990 | Fallin .................................. | 370/229 |
| 4,907,224 | * | 3/1990 | Scoles et al. ........................ | 370/443 |
| 5,303,234 | * | 4/1994 | Kou ..................................... | 370/442 |
| 5,689,507 | * | 11/1997 | Bloks et al. ......................... | 370/389 |
| 5,790,535 | * | 8/1998 | Kou ..................................... | 370/337 |
| 5,951,664 | * | 9/1999 | Lambrecht et al. ................. | 710/124 |
| 5,960,001 | * | 9/1999 | Shaffer et al. ....................... | 370/448 |
| 6,097,878 | * | 8/2000 | Saib ...................................... | 386/83 |

FOREIGN PATENT DOCUMENTS

0674410 A1    9/1995    (EP) .............................. H04L/12/40

OTHER PUBLICATIONS

Excerpt from IEEE Standard for a High Performance Serial Bus, Standard 1394, dated 1995, pp. 204, 216–217.

* cited by examiner

Primary Examiner—Sumati Lefkowitz
(74) Attorney, Agent, or Firm—Rosenthal & Osha LLP

(57) ABSTRACT

A serial bus control apparatus is disclosed. The apparatus includes a device for providing a reservation control table for reserving a transmission bandwidth and a transmission channel used at a future time on a serial bus. The reservation control table is organized such that transmission of data of certain bandwidth and channel at a certain future time can be reserved for a transmission between arbitrary nodes. The reservation control table is stored and controlled on a first register. The register is accessible for reading and writing from an arbitrary node on the serial bus. The apparatus may further include a detection part to detect present time and a second and third register for securing available transmission bandwidth and channel at present time. By having this reservation control table, it becomes possible for each node on the serial bus to secure transmission of data of certain bandwidth and transmission channel in a desired future time.

6 Claims, 13 Drawing Sheets

| #0 | RESERVATION 7 | PHYSICAL_ID 6 | REQUEST_CHANNEL _NUMBER 6 | REQUEST_BW 13 |
|---|---|---|---|---|
| | START_SECOND_COUNT_HI 25 | | | START_SECOND_COUNT_LO 7 |
| | END_SECOND_COUNT_HI | | | END_SECOND_COUNT_LO |

| #1 | RESERVATION 7 | PHYSICAL_ID 6 | REQUEST_CHANNEL _NUMBER 6 | REQUEST_BW 13 |
|---|---|---|---|---|
| | START_SECOND_COUNT_HI 25 | | | START_SECOND_COUNT_LO 7 |
| | END_SECOND_COUNT_HI | | | END_SECOND_COUNT_LO |

| #2 | RESERVATION 7 | PHYSICAL_ID 6 | REQUEST_CHANNEL _NUMBER 6 | REQUEST_BW 13 |
|---|---|---|---|---|
| | START_SECOND_COUNT_HI 25 | | | START_SECOND_COUNT_LO 7 |
| | END_SECOND_COUNT_HI | | | END_SECOND_COUNT_LO |

| #M | RESERVATION 7 | PHYSICAL_ID 6 | REQUEST_CHANNEL _NUMBER 6 | REQUEST_BW 13 |
|---|---|---|---|---|
| | START_SECOND_COUNT_HI 25 | | | START_SECOND_COUNT_LO 7 |
| | END_SECOND_COUNT_HI | | | END_SECOND_COUNT_LO |

INITIAL VALUE

| RESERVATION 7 | XXXXXX 6 | XXXXXX 6 | 0000000000000 13 |
|---|---|---|---|
| XXXXXXXXXXXXXXXXXXXXXXXXX 25 | | | XXXXXX 7 |
| XXXXXXXXXXXXXXXXXXXXXXXXX | | | XXXXXX |

FIG. 2 (TIME_SCHEDULE REGISTER)

| #0 | RESERVATION | 000000 | 000001 | 0011000100000 |
|---|---|---|---|---|
| — 7 — | — 6 — | — 6 — | — 13 — |
| 00000000000000010101000 | 1100000 |
| — 25 — | — 7 — |
| 00000000000000111111010 | 0100000 |
| — 7 — |
| #1 | RESERVATION | XXXXXX | XXXXXX | 0000000000000 |
| — 7 — | — 6 — | — 6 — | — 13 — |
| XXXXXXXXXXXXXXXXXXXXXXX | XXXXXX |
| — 25 — | — 7 — |
| XXXXXXXXXXXXXXXXXXXXXXX | XXXXXX |

| October 10  0 o'clock  \|  6 o'clock | BANDWIDTH_AVAILABLE bw_remaining | 1001100110011 |
|---|---|---|
| | channel_available_lo | 1111111111111111 1111111111111111 |
| October 10  6 o'clock  \|  18 o'clock | BANDWIDTH_AVAILABLE bw_remaining | 0110100010011 |
| | channel_available_lo | 1111111111111111 1111111111111101 |
| October 10  18 o'clock  \|  24 o'clock | BANDWIDTH_AVAILABLE bw_remaining | 1001100110011 |
| | channel_available_lo | 1111111111111111 1111111111111111 |

*Fig. 5*

BUS_ID=0
TSM#0

0
| RESERVATION | 000100 | 000000 | 0011000100000 |
|---|---|---|---|
| 00000000000000101010001 | | | 1100000 |
| 00000000000000101010011 | | | 0000000 |

1
| RESERVATION | 000100 | 000001 | 0000010111100 |
|---|---|---|---|
| 00000000000000101010001 | | | 1100000 |
| 00000000000001101001011 | | | 1100000 |

2
| RESERVATION | XXXXXX | XXXXX | 0000000000000 |
|---|---|---|---|
| XXXXXXXXXXXXXXXXXXXXXX | | | XXXXXX |
| XXXXXXXXXXXXXXXXXXXXXX | | | XXXXXX |

*FIG. 8B*

BUS_ID=1
TSM#1

0
| RESERVATION | 000000 | 000000 | 001100010000 |
|---|---|---|---|
| 00000000000000010101000 | | | 1100000 |
| 00000000000000111111010 | | | 0100000 |

1
| RESERVATION | 000000 | 000001 | 0000010111100 |
|---|---|---|---|
| 00000000000000101010001 | | | 1000000 |
| 00000000000001101001011 | | | 1100000 |

2
| RESERVATION | XXXXXX | XXXXX | 0000000000000 |
|---|---|---|---|
| XXXXXXXXXXXXXXXXXXXXXX | | | XXXXXX |
| XXXXXXXXXXXXXXXXXXXXXX | | | XXXXXX |

*FIG. 8C*

BUS_ID=2
TSM#2

0
| RESERVATION | 000001 | 000000 | 0110001000000 |
|---|---|---|---|
| 00000000000000101010001 | | | 1000000 |
| 00000000000000101010011 | | | 0000000 |

1
| RESERVATION | XXXXXX | XXXXX | 000000000000 |
|---|---|---|---|
| XXXXXXXXXXXXXXXXXXXXXX | | | XXXXXX |
| XXXXXXXXXXXXXXXXXXXXXX | | | XXXXXX |

2
| RESERVATION | XXXXXX | XXXXX | 0000000000000 |
|---|---|---|---|
| XXXXXXXXXXXXXXXXXXXXXX | | | XXXXXX |
| XXXXXXXXXXXXXXXXXXXXXX | | | XXXXXX |

*FIG. 8D*

| | | BUS_ID=0<br>IRM #0 | BUS_ID=1<br>IRM #1 | BUS_ID=2<br>IRM #2 |
|---|---|---|---|---|
| October 10<br>0-6 o'clock | BANDWIDTH_AVAILABLE<br>Bw_remaining | 1001100110011 | 1001100110011 | 1001100110011 |
| | Channels_available_lo | 1111111111111111<br>1111111111111111 | 1111111111111111<br>1111111111111111 | 1111111111111111<br>1111111111111111 |
| October 10<br>6-12 o'clock | BANDWIDTH_AVAILABLE<br>Bw_remaining | 1001100110011 | 0101000010011 | 1001100110011 |
| | Channels_available_lo | 1111111111111111<br>1111111111111111 | 1111111111111111<br>1111111111111110 | 1111111111111111<br>1111111111111111 |
| October 10<br>12-18 o'clock | BANDWIDTH_AVAILABLE<br>Bw_remaining | 0011000110111 | 0100001010111 | 0011011110011 |
| | Channels_available_lo | 1111111111111111<br>1111111111111100 | 1111111111111111<br>1111111111111100 | 1111111111111111<br>1111111111111110 |
| October 10<br>18-24 o'clock | BANDWIDTH_AVAILABLE<br>Bw_remaining | 0011000110111 | 1001001110111 | 0011011110011 |
| | Channels_available_lo | 1111111111111111<br>1111111111111100 | 1111111111111111<br>1111111111111101 | 1111111111111111<br>1111111111111110 |
| October 11<br>0-6 o'clock | BANDWIDTH_AVAILABLE<br>Bw_remaining | 1001001110111 | 1001001110111 | 1001100110011 |
| | Channels_available_lo | 1111111111111111<br>1111111111111101 | 1111111111111111<br>1111111111111101 | 1111111111111111<br>1111111111111111 |
| October 11<br>6 o'clock - | BANDWIDTH_AVAILABLE<br>Bw_remaining | 1001100110011 | 1001100110011 | 1001100110011 |
| | Channels_available_lo | 1111111111111111<br>1111111111111111 | 1111111111111111<br>1111111111111111 | 1111111111111111<br>1111111111111111 |

*Fig. 9*

DEFINITION
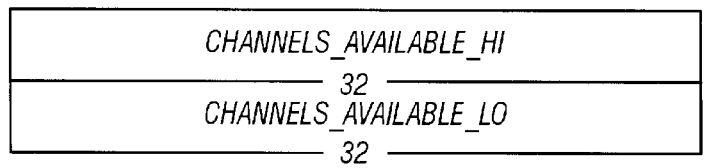
INITIAL VALUE
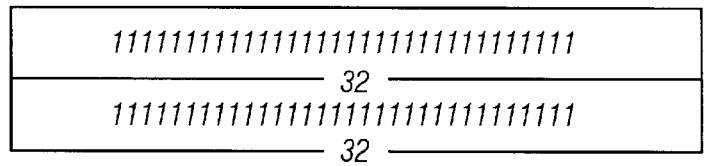
CHANNELS_AVAILABLE REGISTER
FIG. 12
*(Prior Art)*
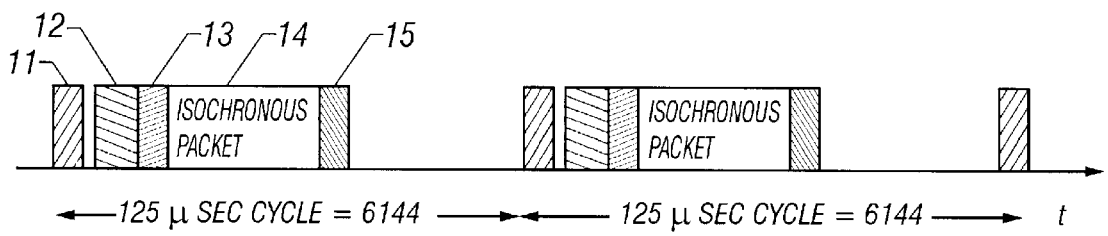
FIG. 13A
*(Prior Art)*
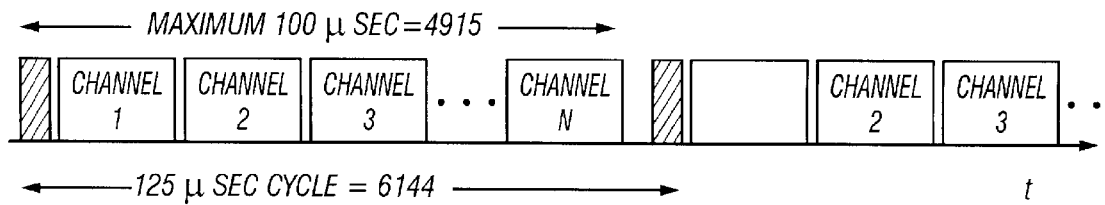
FIG. 13B
*(Prior Art)*

Definition

BUS_TIME Register

Definition

| BUS_ID | Physical_ID | Request_channel _number | Request_bw ||
|---|---|---|---|---|
| start_second_count_hi ||| start_second_count_lo ||
| end_second_count_hi ||| end_second_count_lo ||

TIME_SCHEDULE Register

*Fig. 15*

RESERVATION OF TRANSMISSION BANDWIDTH AND CHANNEL RESERVATION FOR IEEE 1394 BUS

BACKGROUND OF THE INVENTION

1. Field of the Invention

The present invention relates to a serial bus control apparatus for controlling and performing a reservation of a transmission bandwidth and a transmission channel using the IEEE 1394 serial bus etc.

2. Description of the Prior Art

In recent years, two or more AVC equipment such as digital VCRs and personal computers are connected by using the ISO IEC 13213 conforming serial bus such as IEEE 1394 serial buses, and a bandwidth secured transmission (isochronous transmission) of the video and the audio data is performed.

FIG. 10 shows an example of the conventional method for performing a dubbing by a serial bus control apparatus when two digital VCRs generally used are connected each other by the IEEE 1394 serial bus. The isochronous transmission which uses IEEE 1394 is described in detail in the standard book "IEEE Standard for a High Performance Serial BUS" of IEEE Standard 1394—1995. One example of the conventional serial bus control apparatus above mentioned is described with reference to the drawing. FIG. 10 shows the appearance of the dubbing in a digital VCR where a conventional serial bus control apparatus is installed. As shown in FIG. 10, 1 denotes a first digital VCR, 2 denotes a second digital VCR, both VCRs are the nodes of the IEEE 1394 serial buses. 5 denotes the IEEE 1394 serial bus which connects both digital VCR 1 and 2 each other. When both nodes are connected each other by using IEEE 1394, an identification number, which is called physical-ID, is automatically allotted to each node respectively. In this case, the allotted ID number for the node of the first digital VCR is physical_ID=0 and the allotted ID number for the node of the second digital VCR is physical_ID=1. Data for which real time processing is required, such as video data or audio data etc., is transmitted in IEEE 1394 with a transmission system which secures the transmission band and the transmission channel, which is usually called isochronous transmission.

FIG. 13 shows the appearance of the isochronous transmission. In the isochronous transmission, a node which is called a cycle muster (hereinafter, referred to as CM) performs a broadcast transmission of a cycle start packet 11 to the entire bus at 125 μsec cycles.

When the broadcast transmission of the cycle start packet is performed, the isochronous packet can be ready to transmit. At this time, a serial bus control apparatus which is called an isochronous resource manager (hereinafter, referred to as IRM) exists on the bus. To performs the isochronous transmission, it is necessary to declare securing the isochronous resource by using a register for securing the bandwidth (BANDWIDTH_AVAILABLE register) and a register for securing the channel (CHANNELS_AVAILABLE register) which IRM provides.

FIG. 11 and FIG. 12 show the bit allotment of the BANDWIDTH_AVAILABLE register and the CHANNELS_AVAILABLE register respectively. These registers are allotted in the CSR space defined by ISO/IEC 13213 as a serial bus dependent register. The BANDWIDTH_AVAILABLE register is a register of 32 bits (corresponding to 1 quadlet) as shown in FIG. 11, the upper 19 bits are the reserved field, and lower 13 bits (bw_remaining) have significance. bw_remaining shows the isochronous bandwidth which can be allocated at the present time, and the initial value is 1001100110011b (corresponding to 4915d). The time to transmit and perform 1 quadlet with 1572.864 Mbps is defined as 1, and 125 μsec corresponds to 6144d. The time which can be allotted for the isochronous transmission is about 100 μsec, and it corresponds to a default value of 4915d. "b" fixed to the end of the figure indicates that the figure is the binary number and "d" indicates that the figure is the decimal number. It is necessary to rewrite the value of this register to start to perform the isochronous transmission. For instance, if 10 μsec of 125 μsec is required to be allotted to the isochronous transmission, 10 μsec corresponds to 492d, therefore, bandwidth is secured by rewriting the value of the register bw_remaining as 4423d (1000101000111b) (it is calculated as 4915d−492d=4423d).

Moreover, it is necessary to perform securing the transmission channel to perform the isochronous transmission. Securing the transmission channel is performed by using the CHANNELS_AVAILABLE register shown in FIG. 12. This register is composed of 64 bits (corresponding to 2 quadlet), the upper 32 bits are defined as channels_available_hi and the lower 32 bits are defined as channels_available_lo. The isochronous channel of IEEE 1394,64 of the 0th channel to the 63rd channels in total is available. The initial value of the CHANNELS_AVAILABLE register is 1111111111111111111111111111111111111111111111111111111111111111b, and it indicates that all 64 channels are unused and available. For instance, in order to secure the first channel, the value of the CHANNELS_AVAILABLE register is rewritten as 1111111111111111111111111111111111111111111111111111111111111101b. That is, each bit indicates the use of the channel of 0 to 63, and 1 is defined as used channel, 0 is defined as an unused channel.

In order to perform the isochronous transmission, the transmission bandwidth (corresponding to 125 μsec) and the transmission channel are secured by setting of the BANDWIDTH_AVAILABLE register and the CHANNELS_AVAILABLE register, then the cycle start packet is transmitted as shown in FIG. 13(a), afterward the isochronous packet is transmitted after a gap time which is called an isochronous gap. In FIG. 13(a), 12 indicates the period which is called a bus arbitration period, two or more nodes request the packet transmission to one bus at the same time, only one node can acquire the authority for the packet transmission. 13 indicates a period which is called a data prefix period, or the period after which the packet is immediately transmitted. 14 indicates isochronous packet period, or the period for which the transmission data is transmitted. 15 indicates a period which is called the data end, it indicates that the transmission of the packet is ended. As shown in FIG. 13(b), the period in which the isochronous packet can be transmitted is about 100 μsec after the cycle start, or the period for which the packet of two or more channels can be transmitted.

As shown in FIG. 10, in this case, the second digital VCR is an IRM, the BANDWIDTH_AVAILABLE register and the CHANNELS_AVAILABLE register are available to IEEE 1394 serial bus 5. When the digital data of the first digital VCR is transmitted to the second digital VCR using the isochronous transmission, the data transmission (dubbing) is started after securing the transmission bandwidth and the transmission channel by the above-mentioned procedure. For instance, the first digital VCR and the second digital VCR are equipped with a physical layer which has the transmission ability of S100 (it is the transmission standard of 98.304 Mbps in the IEEE 1394). When the bandwidth of 40 Mbps is transmitted by the channel 0, 40 Mbps corresponds to 2500d, isochronous transmission is started with rewriting the value of bw_remaining as 0100101101111 (because4915d−2500d=2415d= 0100101101111), and the 0th bit of the channels_ available_lo as 0b.

However, the above mentioned conventional serial bus control apparatus can only secure the current transmission bandwidth and the current transmission channel. There is no concept for time reservation of the transmission bandwidth and transmission channel. Therefore, when it is necessary to use the bus at certain period in future, it is not sure that the required transmission bandwidth and transmission channel is available or not.

Because of this, there are inconveniences in the serial bus control apparatus. For instance, when recording a program from the set top box connected with the bus to the digital VCR at certain time in the future with reservation by the timer, and if other nodes occupied the bus at the reserved time, the reserved recording by the timer can not be performed.

SUMMARY OF THE INVENTION

Therefore, with the foregoing in mind, it is an object of the present invention to provide a serial bus control apparatus for controlling the utilization of a bus, which can secure a transmission bandwidth and a channel of IEEE 1394 serial bus, at present time and future time.

In order to achieve the objects, a serial bus control apparatus of the present invention includes a means for providing a table for controlling a serial bus which has a function for securing a transmission bandwidth for the packet to the serial bus. The table is a reservation control table at least indicating a reservation of a transmission bandwidth and a transmission channel which is required from time T1 until time T2, the reservation control table is stored and controlled on a first register assigned to an address space which is accessible for reading and writing from an arbitrary node on the serial bus.

In one embodiment, the serial bus control apparatus of the present invention preferably includes a first detection part to detect that the present time is the time T1, the time T2, or the time between T1 and T2. Moreover, the serial bus control apparatus of the present invention preferably includes a rewriting part for rewriting a second register and a third register assigned to a particular address space for a particular node on the serial bus, which second register indicates the available transmission bandwidth at the present time and which third register indicates the utilization status of the transmission channel at the present time.

In one embodiment, the particular node on the serial bus is a node, which belongs to the serial bus control apparatus, and a node which includes the second register and the third register control apparatus of the present invention preferably includes the second and third registers.

In one embodiment, the serial bus control apparatus of the present invention preferably includes a register providing part for providing a register for reservation control table which table is accessible for reading and writing from an arbitrary node of an arbitrary bus of the N piece of serial buses having the same standard time, In accordance with the present invention, A reservation management for future time using a serial bus for securing the transmission bandwidth and transmission channel according to IEEE 1394 can be achieved, which is not possible with conventional technology. Moreover, the serial bus control apparatus of this invention is compatible with conventional systems.

These and other advantages of the present invention will become apparent to those skilled in the art upon reading and understanding the following detailed description with reference to the accompanying figures.

BRIEF DESCRIPTION OF THE DRAWINGS

FIG. 2 is a first bit field chart showing a TIME_ SCHEDULE register of this invention.

FIG. 5 is a register state transition diagram of Embodiment 1 of this invention.

FIGS. 8(b) to (d) are bit field charts showing TIME_ SCHEDULE registers of Embodiment 1 of this invention.

FIG. 9 is a register state transition diagram of Embodiment 2 of this invention.

FIG. 12 is a bit field chart of showing CHANNELS_ AVAILABLE register of IEEE 1394.

FIGS. 13(a) and (b) are a status charts showing an isochronous transmission of IEEE 1394.

FIG. 15 is a second bit field chart showing a TIME_ SCHEDULE register of this invention.

DESCRIPTION OF THE PREFERRED EMBODIMENTS

Hereinafter, the present invention will be described by way of embodiments with reference to the accompanying drawings.

Embodiment 1

Figure 1:
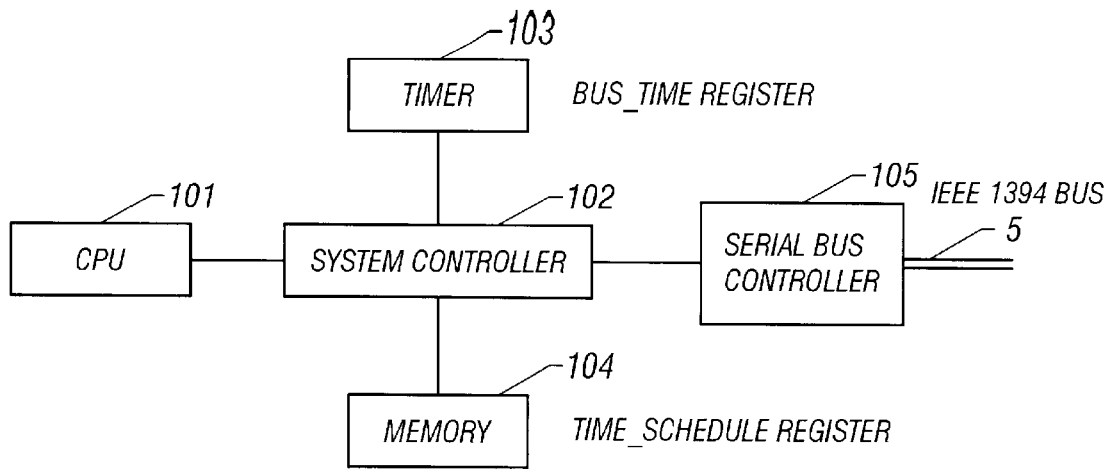
FIG. 1 is a block diagram showing a serial bus control apparatus of Embodiment 1 of this invention.

FIG. 1 shows a block diagram of a node which includes a first preferred example of a serial bus control apparatus of this invention.

In FIG. 1, 101 denotes a CPU which controls a node. 102 denotes a system controller which includes an interface for the CPU 101, a memory 104, a timer 103 and a serial bus controller 105. 105 denotes a serial bus controller 105 for controlling data transmission of a serial bus of IEEE 1394. 5 denotes a serial bus of IEEE 1394. By this composition, a register which is called a TIME_SCHEDULE register is provided to the IEEE serial bus. The serial bus control apparatus of this invention is called as a Time Schedule Manager (hereinafter, referred to as TSM). The TSM composed as mentioned above can be built into personal computer 3 of FIG. 3 for instance.

Figure 3:
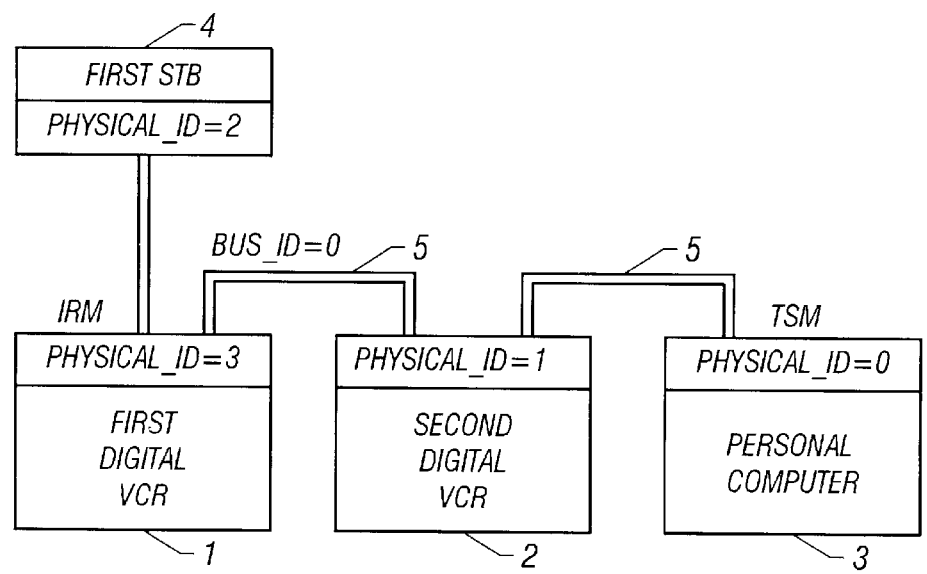
FIG. 3 is a bus block diagram of Embodiment 1 of this invention.

FIG. 3 shows the bus composition which includes the node which has a serial bus controller (Time Schedule Manager, hereinafter referred to as TSM), of this invention.

1 denotes a first digital VCR, 2 denotes a second digital VCR, 3 denotes a personal computer, 4 denotes a set top box (hereinafter, referred to as STB). It is assumed that the transmission ability of the physical layer is S100.

Physical_ID is allotted to each node based on the rule of IEEE1394. The physical_ID allotted to the first digital VCR 1 is 3 (physical_ID=3), the physical_ID allotted to the second digital VCR 2 is 1 (physical_ID=1), the physical_ID allotted to the personal computer 3 is 0 (physical_ID=0), the physical_ID allotted to the first set top box 4 is 2 (physical_ID=2).

In this example, the first digital VCR of physical_ID=3 performs as an IRM, and provides the BANDWIDTH_AVAILABLE register and the CHANNELS_AVAILABLE register to the IEEE 1394 serial bus. This node includes a CM function and performs the broadcast of the cycle start packet to the bus.

The TIME_SCHEDULE register is provided to the CSR space of the personal computer 3. The substance of the TIME_SCHEDULE register is the memory 104 shown in FIG. 1. If there is a request for writing data to TIME_SCHEDULE register or reading data from the TIME_SCHEDULE register by the serial bus controller 105, the CPU 101 actually writes data to memory 104 or reads data from memory 104 and returns the result to the serial bus controller 105.

FIG. 2 shows an example of the bit allotment of the TIME_SCHEDULE register. The register of three quadlet is defined corresponding to one time schedules. The #0 to the #M TIME_SCHEDULE register (M is an integer of 0 or more) is defined in the continuous address to control two or more time schedule.

In the TIME_SCHEDULE register, the upper seven bits of the quadlet are not used. The following six bits are physical_ID of the node which preserves the time schedule. The following six bits indicate the channel number which is reserved and performed with request_channel_number. The following 13 bits indicate the bandwidth to be reserved by request_bw.

The second quadlet indicates the time when the reservation is started and performed. According to the definition of the BUS_TIME register of IEEE 1394, the upper 25 bits are defined as the start_second_count_hi and the lower 7 bits are defined as start_second_count_lo.

The third quadlet indicate the time when the reservation is ended and performed. According to the definition of the BUS_TIME register of IEEE 1394, the upper 25 bits are defined as the start_second_count_hi and the lower 7 bits are defined as start_second_count_lo.

Figure 14:
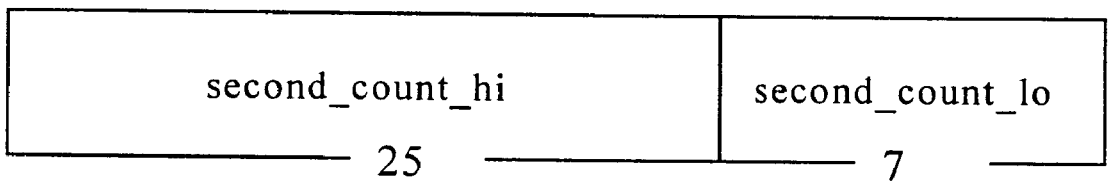
FIG. 14 is a bit field chart showing a BUS_TIME register of IEEE 1394.

FIG. 14 shows the BUS_TIME register of the serial bus of IEEE 1394. It is a counter of 32 bits which counts by second and can count 136 years of time. In the above description, the 32 bits are separated into second_count_hi and second_count_lo. However, the separation has no special meaning in this Embodiment 1.

The initial value of the TIME_SCEDULE register is request_bw=000000000000b. Other bits can take any value. As a result, The ID number of the TIME_SCHEDULE register which is used for the time reservation can be detected.

Figures 4A, 4B:
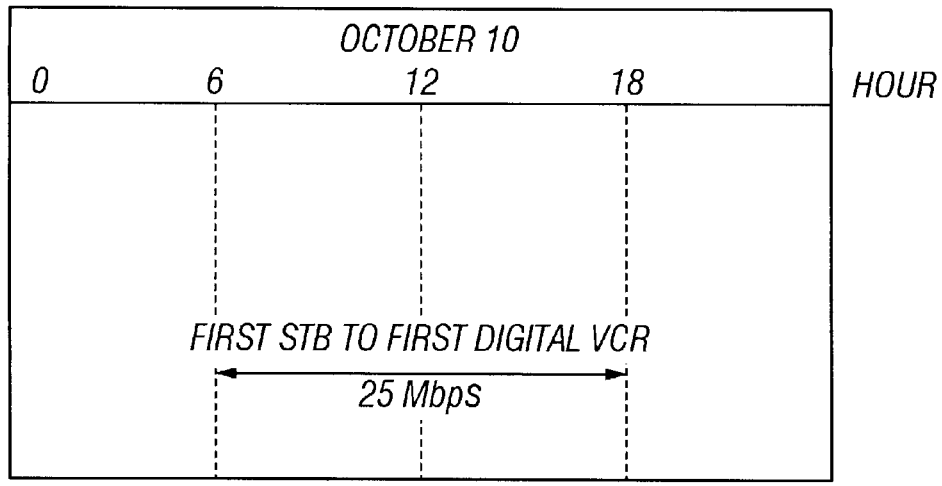
FIG. 4(a) is a reservation table of Embodiment 1 of this invention.
FIG. 4(b) is a bit field chart showing TIME_SCHEDULE register of Embodiment 1 of this invention.

As shown in FIG. 4(*a*), in order to operate the reserved recording from the first set top box shown in FIG. 3 to the first digital VCR from 6 o'clock to 18 o'clock on October 10, when the personal computer reserves 25 Mbps bandwidth by channel 1, the bit assignment are that physical_ID=000000b, request_channel_number=000001b, request_bw=0011000100000b, start_second_count_hi= 0000000000000000001010100b, start_second_count_lo=100000b, end_second_count_hi= 0000000000000000111111010b, start_second_count_lo=0100000b.

This value is written in the TIME_SCHEDULE register. To simplify explanation, in the BUS_TIME, 0 o'clock of October 10 is set to as 0.

Moreover, this reservation is set to the #0 TIME_SCHEDULE register and assigned bit in other register is request_bw=0000000000000b. Therefore, other time reservation is not set.

Moreover, before reservation, the node performing reservation reads out all TIME_SCHEDULE registers and confirms that necessary bandwidth and channel are available or not at the time to be reserved. If necessary bandwidth and channel are available at the time to be reserved, the reserved recording can be set.

FIG. 5 shows the change in the BANDWIDTH_AVAILABLE register and the CHANNELS_AVAILABLE register of IRM of the reservation mentioned above.

The values of these registers for between 0 o'clock and 6 o'clock on October 10 are the initial values. In this Embodiment 1, the channels_available_hi which is the upper 32 bits of the CHANNELS_AVAILABLE register is not described because it has not been changed from the initial value. The bandwidth of 25 Mbps is used by channel 1 for between 6 o'clock and 18 o'clock on October 10, the isochronous transmission is started with rewriting the bw_remaining as(1001100110011b−0011000100000b=) 01101000110011b,and the channels_available_lo as 11111111111111111111111111111101b. Rewriting of these two registers can be performed by any node on the bus. It is not necessary that the node of physical_ID=000000b performs the rewriting.

After 18 o'clock on October 10, the bus is used. Therefore, the BANDWIDTH_AVAILABLE register and the CHANNELS_AVAILABLE register are returned to the initial value. When the reserved time is over, request_bw of the corresponding TIME_SCHEDULE register should be reserved to 0000000000000b.

According to the above mentioned preferred Embodiment 1, the serial bus control apparatus of this invention includes a BANDWIDTH_AVAILABLE register and a CHANNELS_AVAILABLE register controlled by the IRM as well as TIME_SCHEDLUE register of the TSM of the present invention. The serial bus control apparatus controls the reservation information regarding time schedule by the TIME_SCHEDLUE register and secures the isochronous bandwidth and isochronous channel using the BANDWIDTH_AVAILABLE register and the CHANNELS_AVAILABLE register at the time to be reserved.

According to this operation, the reservation management for future time can be achieved, which is not possible by the conventional technology. Moreover, the serial bus control apparatus of this invention is compatible with conventional systems.

Embodiment 2

Hereinafter, Embodiment 2 of the present invention will be described with reference to the accompanying drawings.

Figure 6:
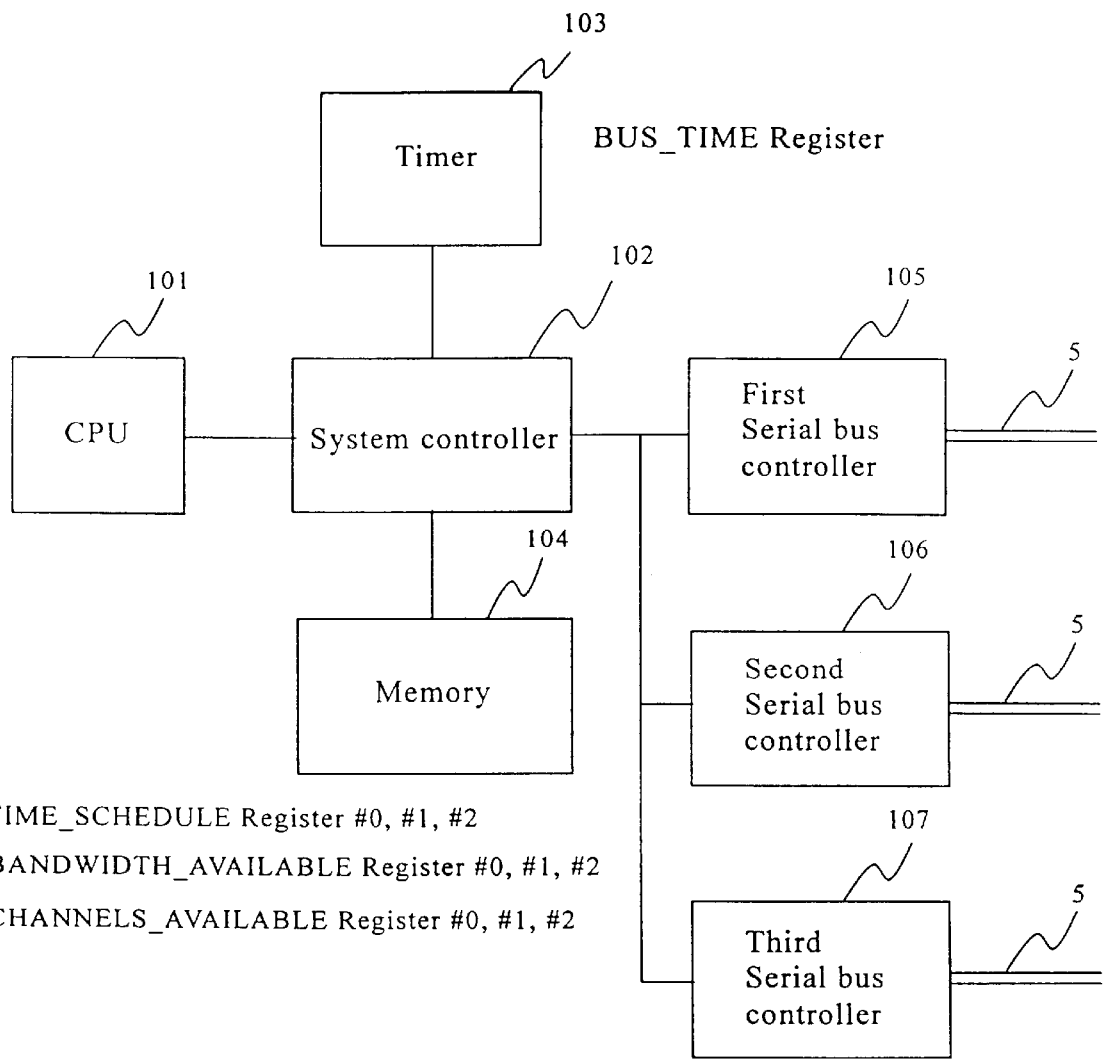
FIG. 6 is a block diagram showing a serial bus control apparatus of Embodiment 2 of this invention.

FIG. 6 shows a block diagram of a serial bus bridge as a serial bus control apparatus including plural of serial buses having the TSM of Embodiment 2 of this invention. In FIG. 6, 101 denotes CPU, which controls a node. 102 denotes a system controller which includes an interface for the CPU 101, a memory 104, a timer 103 and a serial bus controller 105, 106 and 107. Each 105 to 107 denotes a serial bus controller for controlling data transmission of a serial bus of IEEE 1394. 5 denotes a serial bus of IEEE 1394. By this composition, a register which is called a TIME_SCHEDULE register is provided to the IEEE serial bus. Normally, it is better that the bus bridge acts as IRM for each bus. Therefore, the BANDWIDTH_AVAILABLE register and the CHANNELS_AVAILABLE register to be provided to each bus are equipped. Two or more buses are connected and perform using the above described bus bridge in which TMS is equipped.

Figure 7:
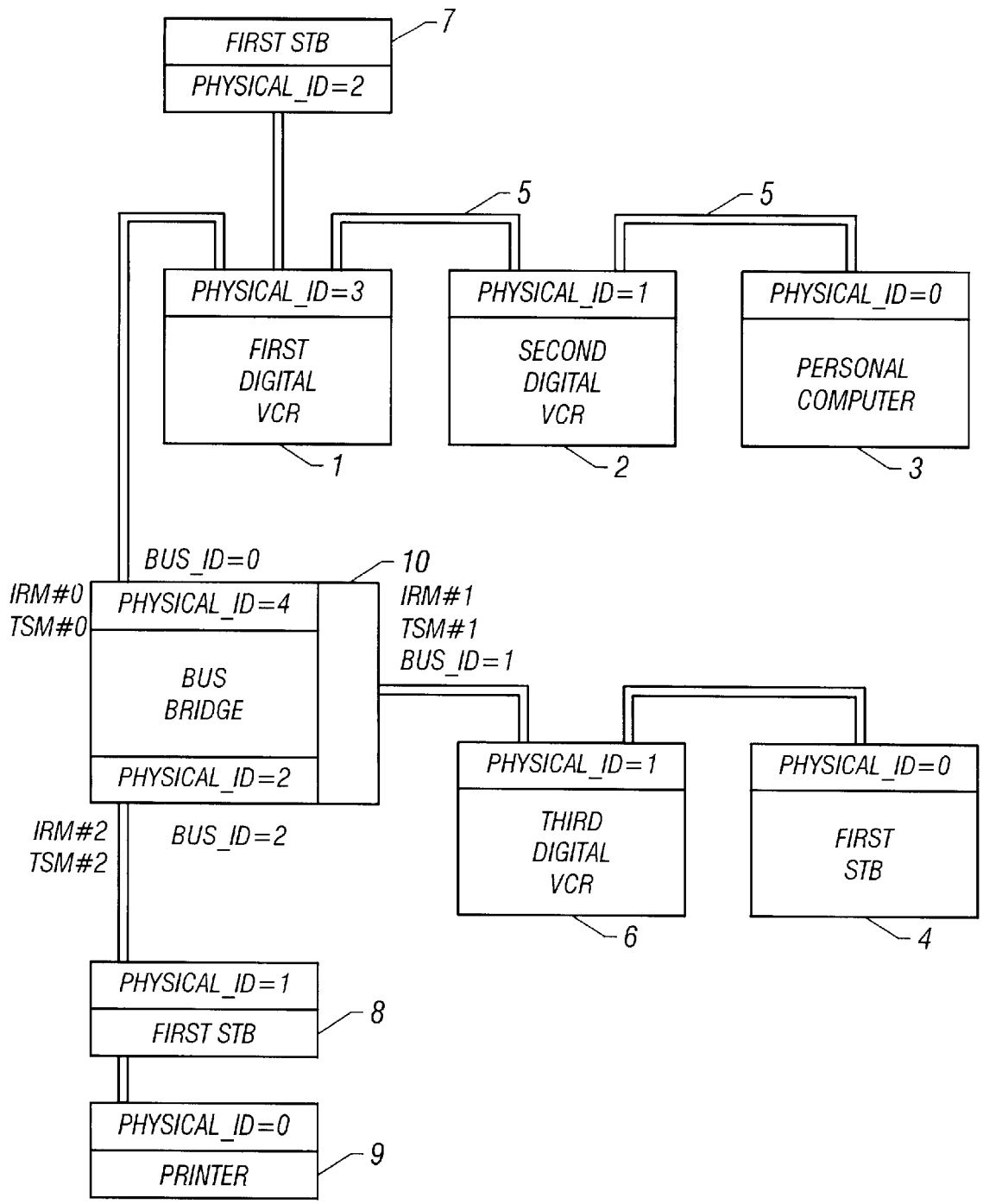
FIG. 7 is a bus block diagram of Embodiment 2 of this invention.

FIG. 7 shows the bus composition which includes the plural bus connected via bus bridge having the serial bus controller (TSM) of this invention. 1 denotes a first digital VCR, 2 denotes a second digital VCR, 3 denotes a personal computer, 7 denotes a first digital television set (hereinafter, referred to as TV). These nodes are connected to the serial bus whose BUS_ID is 0 (BUS_ID=0), and connected to the bus bridge 10. 6 denotes a third digital VCR and 4 denotes a first STB. These nodes are connected to the serial bus whose BUS_ID is 1 (BUS_ID=1), and connected to the bus bridge 10. 8 denotes a second STB, and 9 denotes a printer. These nodes are connected to the serial bus whose BUS_ID is 2, and connected with bus bridge 10. It is assumed that the transmission ability of the physical layer of each bus is S100.

Physical_ID is allotted to each node of buses based on the rule of IEEE1394. Regarding the BUS_ID=0, the physical_ID allotted to the first digital VCR 1 is 3 (physical_ID=3), the physical_ID allotted to the second digital VCR 2 is 1 (physical_ID=1), the physical_ID allotted to the personal computer 3 is 0 (physical_ID=0), the physical_ID allotted to the bus bridge 10 is 4 (physical_ID=4). Regarding the BUS_ID=1, the physical_ID allotted to the third digital VCR 1 is 1 (physical_ID=1), the physical_ID allotted to the first STB 4 is 0 (physical_ID=0), the physical_ID allotted to the bus bridge 10 is 2 (physical_ID=2). Regarding the BUS_ID=2, the physical_ID allotted to the second STB 8 is 1 (physical_ID=1), the physical_ID allotted to the printer 9 is 0 (physical_ID=0), the physical_ID allotted to the bus bridge 10 is 2 (physical_ID=2).

In this example, the bus bridge 10 becomes CM, IRM, and TSM in order to achieve the cycle synchronization of each bus and to control the plural buses efficiently. That is, synchronization is taken respectively for each bus, the cycle start packet is broadcasted, and the independent BANDWIDTH_AVAILABLE register, CHANNELS_AVAILABLE register and TIME_SCHEDULE register are provided to each bus. The substance of each register provided to each bus is a memory 104 shown in FIG. 6. If there is a request for writing data to each register or reading data from each register by the serial bus controller 105~107, the CPU 101 actually writes data to memory 104 or reads data from memory 104 and returns the result to the serial bus controller 105~107.

An example of the bit allotment for each register can be the same as Embodiment 1.

Figure 8A:
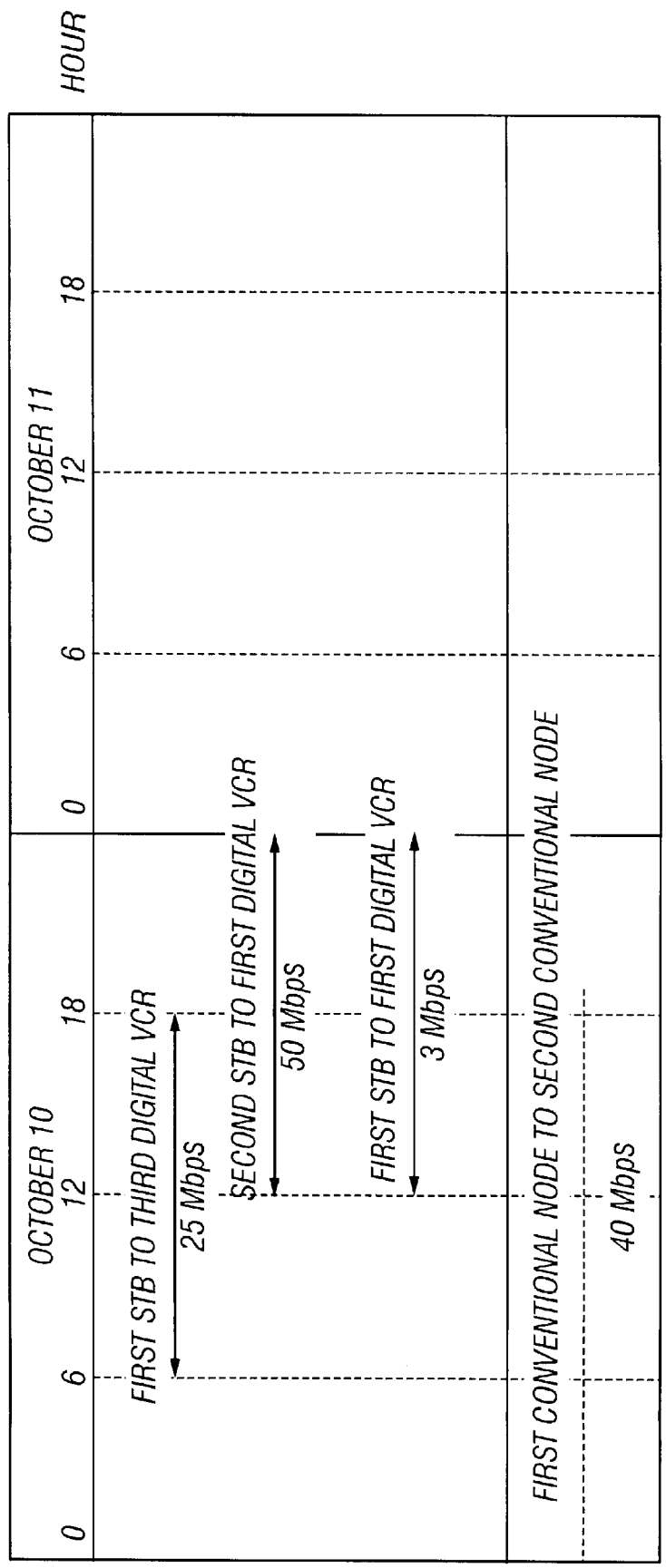
FIG. 8(a) is a reservation table of Embodiment 2 of this invention.
Figures 10, 11:
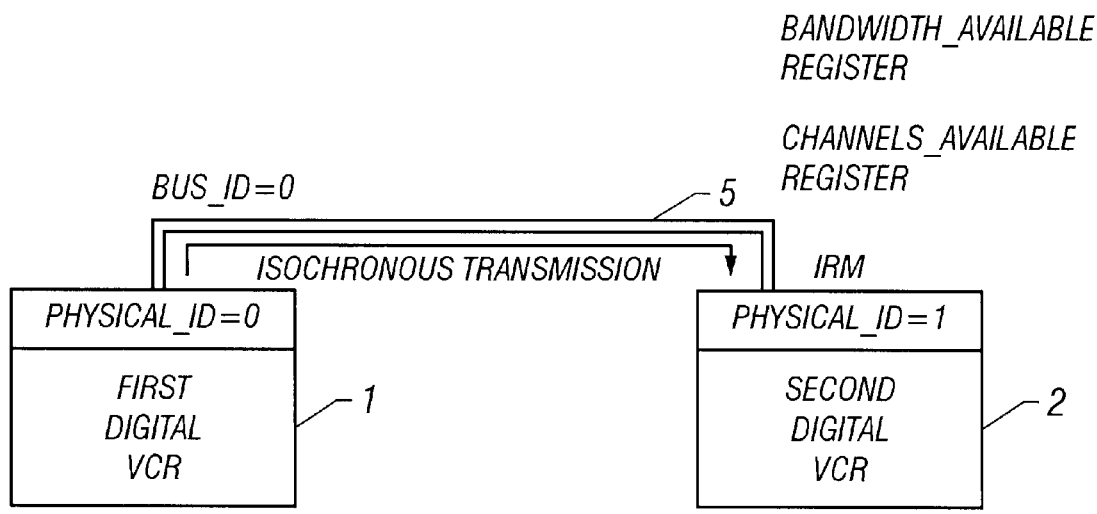
FIG. 10 is a bus block diagram of the conventional technology.
FIG. 11 is a bit field chart of showing BANDWIDTH_ AVAILABLE register of IEEE 1394.

As shown in FIG. 8(a), in order to operate the reserved recording from the first set top box shown in FIG. 6 to the third digital VCR from 6 o'clock to 18 o'clock on October 10, when the first STB reserves 25 Mbps bandwidth by channel 0, data transmission is performed on the bus whose BUS_ID is 0 (BUS_ID=0), data is written in the TIME_SCHEDULE register of the TSM # 1 of the BUS_ID=1.

In this case, as shown in FIG. 8(c) #0, the bit assignments are that physical_ID=000000b, request_channel_number=000000b, request_bw=0011000100000b, start_second_count_hi=0000000000000000101101000b, start_second_count_lo=1100000b, end_second_count_hi=00000000000000000011111010b, start_second_count_lo=0100000b.

These values are written in the TIME_SCHEDULE register of TSM #1. The same as Embodiment 1, to simplify the explanation, in the BUS_TIME, 0 o'clock of October 10 is set to 0.

Next, According to FIG. 8(a), the recording reservation is performed from the second STB shown in FIG. 6 to the first digital VCR from 12 o'clock to 24 o'clock on October 10. The second STB is a node of the bus whose BUS_ID=2, and the first digital VCR is a node of the bus whose BUS_ID=0. Therefore, data is transmitted over two buses. Therefore, data is written in the TIME_SCHEDULE register of each TMS of BUS_ID=2 and BUS_ID=0. In this case, reservation to each bus with transmission bandwidth 50 Mbps and channel 0 is set.

It is possible to set reservation using channel 0 of the bus whose BUS_ID=0 and BUS_ID=2 which are available from 12 o'clock to 18 o'clock though the channel 0 of the bus whose BUS_ID=1 has already been used. In this case, data are written in #0 of the table (d) and #0 of the table (d) shown in FIG. 8.

When the second STB makes the reservation, the value of the TIME_SCHEDULE register of the TSM #2 will be rewritten in order to reserve the bus whose BUS_ID is 2. The bit assignments are that physical_ID=000001b, request_channel_number=000000b, request_bw=0110001000000b, start_second_count_hi=0000000000000001101010001b, start_second_count_lo=1000000b, end_second_count_hi=000000000000000010100011b, start_second_count_lo=0000000b.

The value of the TIME_SCHEDULE register of the TSM #0 will be rewritten in order to reserve the bus whose BUS_ID is 0. The bit assignments are that physical_ID=000100b, request_channel_number=000000, request_bw=0101000000b, start_second_count_hi=0000000000000001101010001b, start_second_count_lo=1000000b, end_second_count_hi=00000000000000011101010001b, start_second_count_lo=0000000b.

In this case, because the node of another bus has made reservation to TSM #0 through the bridge, the physical_ID of the bridge of BUS_ID=0 is written to the bit field for physical_ID. In this case, physical_ID=000100b.

In addition, according to FIG. 8(a), the recording reservation from the first STB shown in FIG. 6 to the second digital VCR is performed from 12 o'clock October 10 to 6 o'clock October 11. In this case, data are transmitted over the bus of which BUS_ID=1 and the bus of which BUS_ID=0. Because channel 0 has already been reserved by both bus whose BUS_ID=1 and bus whose BUS_ID=0, it is necessary to reserve other channels. In the above description, channel 1 is selected as a reserved channel because channel 1 in both the bus whose BUS_ID=0 and the bus whose BUS_ID=1 is available, another channel can be selected if it is available in both buses.

In this case, #1 in FIG. 8(c) and #1 in FIG. 8(b) are selected for writing. The register for the TIME_SCHEDULE register can be selected from unused available registers (register whose request_bw=0000000000000b). In the above description, register #1 is selected.

When the first STB makes the reservation, the value of the TIME_SCHEDULE register of the TSM #1 will be rewritten in order to reserve the bus whose BUS_ID is 1. The bit assignments are that physical_ID=000000b,
request_channel_number=000001b,
request_bw=000001111100b,
start_second_count_hi=
 00000000000000000101010000b,
start_second_count_lo=1000000b,
end_second_count_hi=
 00000000000000000110100101b,
start_second_count_lo=1100000b.

The value of the TIME_SCHEDULE register of the TSM #0 will be rewritten in order to reserve the bus whose BUS_ID=0. The bit assignments are that physical_ID=000100b,
request_channel_number=000001b,
request_bw=0000010111100b,
start_second_count_hi=
 00000000000000000101010001b,
start_second_count_lo=1000000b,
end_second_count_hi=00000000000000000101001011b,
start_second_count_lo=100000b.

In this case, because the node of another bus has made reservation to TSM #0 through the bridge, the physical_ID of the bridge of BUS_ID=0 is written to the bit field for physical_ID. In this case, physical_ID=000100b.

The same as Embodiment 1, when a node makes reservation, the node reads out values of all TIME_SCHEDULE register of buses for reserving the bandwidth and confirms whether the necessary bandwidth and necessary channel remains or not. When the necessary bandwidth and necessary channel remains, the node can make reservation. Thus, three kinds of reservations shown in FIG. 8(a) are performed completely.

FIG. 9 shows the change in the BANDWIDTH_AVAILABLE register and the CHANNELS_AVAILABLE register of IRM #0 to #2 by the above mentioned reservation. The value of these registers between from 0 o'clock to 6 o'clock on October 10 remains as the initial values. In this Embodiment 2, because the channels_available_hi, which is the upper 32 bits of the CHANNELS_AVAILABLE register has not been changed and remains as initial value, it is not described.

In the bus whose BUS_ID=1, the bandwidth of 25 Mbps is used by channel 0 between from 6 o'clock to 18 o'clock on October 10, the isochronous transmission is started with rewriting the bw_remaining as (1001100110011b−0011000100000b=) 01101000110011b, and the channels_available_lo as 11111111111111111111111111111110b. Rewriting of this two register can be performed by any node on the bus. It is not necessary that the node of physical_ID=000000b performs the rewriting. Moreover, because the bus bridge is a node which has both the function of TSM and IRM, the node can perform register bit field rewriting automatically by detecting the reserved time arrival by CPU 101 with the built in clock 103.

Between from 12 o'clock to 18 o'clock on October 10, in order to use 50 Mbps bandwidth by channel 0 between the bus whose BUS_ID=2 and the bus whose BUS_ID =0, and to use 3 Mbps bandwidth by channel 1 between the bus whose BUS_ID=1 and the bus whose BUS_ID=0, the isochronous transmission is started with rewriting the register of the IRM #0 as bw_remaining=1001100110011b−0110001000000b−00000010111100b=00110001011b, channels_available_lo=
11111111111111111111111111111100b, rewriting the register of the IRM #1 as bw_remaining=0110100010011b−00000010111100b =0110001010111b, channels_available_lo=1111111111111111111111111111111100b, rewriting the register of the IRM #2 as bw_remaining= 1001100110011b−0110001000000b =0011011110011b, channels_available_lo=
11111111111111111111111111111110b. Rewriting of these registers can be performed by any node on the bus. It is not necessary that the node which had made reservation performs the rewriting. Moreover, because the bus bridge is a node which has both the function of TSM and IRM, the node can perform register bit field rewriting automatically by detecting the reserved time arrival by CPU 01 with the built in clock 103.

Between 18 o'clock to 24 o'clock on October 10, the recording from the first STB to the third digital VCR performed on the bus whose BUS_ID=1 is finished. At this time, it is necessary to release channel 0 which was used for 25 Mbps bandwidth transmission. Therefore, the bit field of the register of the IRM #1 should be rewritten as the bw_remaining=0110001010111b+0011000100000b= 1001001110111b, channels_available_lo= 11111111111111111111111111111101b. Moreover, because the reservation time ended, it is necessary to release the TIME_SCHEDULE register of TSM #1. Because this was written in FIG. 8(c) #0, the request_bw should be rewritten as 0000000000000b in order to enable other nodes to use this register. Rewriting of these registers can be performed by any node on the bus. It is not necessary that the node which had made reservation performs the rewriting. Moreover, because the bus bridge is a node which has both the function of TSM and IRM, the node can perform register bit field rewriting automatically by detecting the reserved time arrival by CPU 101 with the built in clock 103.

Between 0 o'clock to 6 o'clock on October 11, the recording from the second STB to the first digital VCR performed between the bus whose BUS_ID=2 and the bus whose BUS_ID=0 is finished. At this time, it is necessary to release channel 0 which was used for 50 Mbps bandwidth transmission. Therefore, the bit field of the IRM #0 should be rewritten as bw_remaining=0011000110111b+ 0110001000000b=1001001110111b, channels_available_lo=11111111111111111111111111111101b, the bit field of the IRM #2 should be rewritten as the bw_remaining= 0010111100111b+0110001000000b=1001100110011b, channels_available_lo=
11111111111111111111111111111111b. Moreover, because the reservation time ended, it is necessary to release the TIME_SCHEDULE register of TSM #2 and TSM #0. Because this was written in FIG. 8(d) #0 and FIG. 8(b) #0, the request_bw should be rewritten as 0000000000000b in order to enable other nodes to use this register. Rewriting of these registers can be performed by any node on the bus. It is not necessary that the node which had made reservation performs the rewriting. Moreover, because the bus bridge is a node which has both the function of TSM and IRM, the node can perform register bit field rewriting automatically by detecting the reserved time arrival by CPU 101 with the built in clock 103.

After 6 o'clock on October 11, the recording from the first STB to the second digital VCR performed between the bus whose BUS_ID=1 and the bus whose BUS_ID =0 is finished. At this time, it is necessary to release channel 1 which was used for 3 Mbps bandwidth transmission. Therefore, the bit field of the IRM #0 should be rewritten as the bw_remaining=1001100110111b+0000010111100b= 1001100110011b, channels_available_lo= 1111111111111111111111b, the bit field of the IRM #1 should be rewritten as bw_remaining=1001001110111b+ 0000010111100b=1001100110011b, channels_available_ lo=1111111111111111111111111111111b. Moreover, because the reservation time ended, it is necessary to release the TIME_SCHEDULE register of TSM #1 and TSM #0. Because this was written in FIG. 8(c) #0 and FIG. 8(b) #0, the request_bw should be rewritten as 0000000000000b in order to enable other nodes to use this register. Rewriting of these registers can be performed by any node on the bus. It is not necessary that the node which had made reservation performs the rewriting. Moreover, because the bus bridge is a node which has both the function of TSM and IRM, the node can perform register bit field rewriting automatically by detecting the reserved time arrival by CPU 101 with the built in clock 103.

According to the above mentioned preferred Embodiment 2, the serial bus control apparatus of this invention includes BANDWIDTH_AVAILABLE registers and CHANNELS_ AVAILABLE registers controlled by the IRM as well as TIME_SCHEDLUE register of the TSM of the present invention. The serial bus control apparatus controls the reservation information regarding time schedule by the TIME_SCHEDLUE register and secures the isochronous bandwidth and isochronous channel using the BANDWIDTH_AVAILABLE register and the CHANNELS_AVAILABLE register at the time to be reserved.

According to this operation, the reservation management for future time can be achieved, which is not possible with conventional technology. Moreover, the serial bus control apparatus of this invention is compatible with conventional systems. The TIME_SCHEDULE register of this Embodiment does not prepare the bit for describing BUS_ID of the node which made reservation, BUS_ID can be added as shown in FIG. 15 in order to control.

In the case where a conventional node, which does not correspond to the TSM of the present invention, is connected to the bus of the present invention, there are problems in that the conventional node reserves the transmission bandwidth and the transmission channel for IRM without reservation registration in the TIME_SCHEDULE register and starts the isochronous packet transmission. Another problem is that the conventional node releases the transmission bandwidth and the transmission channel for IRM without canceling the reservation for the TIME_SCHEDULE register.

In order to prevent these problems, it is necessary to prohibit the conventional node to access the IRM and TSM. These problems will be solved if the node which corresponds to TSM of this invention performs the reservation and cancellation for bandwidth and channel to IRM and TSM, and the conventional node performs the actual isochronous packet transmission. However, in the case that the conventional node, which does not know the existence of the TSM of the present invention, performs the access for IRM independently and transmits isochronous packet without registration to TSM, for example, in FIG. 8(a), the 40 Mbps isochronous transmission from the first conventional node to the second conventional node without registering TSM, it is impossible to start the reserved 50 Mbps transmission from 12 o'clock on October 10 because of available bandwidth overflow. In this case, the operation of the conventional node should be stopped for stopping the 40 Mbps transmission in order to recover the status of the system as the normal status.

It is also possible to solve the problems by stopping the reserved 50 Mbps transmission from 12 o'clock.

What measures should be taken for these problems is selected by system application with consideration of the priority and the appropriate countermeasure that should be performed.

Moreover, the serial bus of IEEE 1394 is used in the above described Embodiment, other buses are acceptable if that can perform transmission by which the transmission bandwidth is secured.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A serial bus control apparatus, comprising:
   a means for providing a reservation control table for reserving a transmission bandwidth and a transmission channel used at a future time on a serial bus which has a function for securing a transmission bandwidth for a packet to the serial bus, wherein the reservation control table is a table at least indicating a reservation of the transmission bandwidth and the transmission channel which is required from a future time T1 until a future time T2; and
   a first register that stores and controls the reservation control table, the first register being assigned to an address space which is accessible for reading and writing from an arbitrary node on the serial bus.

2. The serial bus control apparatus according to claim 1, further comprising:
   a first detection part to detect that a present time is the time T1, the time T2, or a time between T1 and T2 described in the reservation control table;
   a second register indicating available transmission bandwidth at the present time;

a third register indicating utilization status of the transmission channel at the present time; and a rewriting part that rewrites the second register and the third register based on the detection result of the first detection part, thereby securing the transmission bandwidth and the transmission channel reserved in the reservation control table when the present time reaches the time T1 and releasing the secured transmission bandwidth and the transmission channel when the present time reaches the time T2.

3. The serial bus control apparatus according to claim 2 wherein the particular node on the serial bus is a node, which belongs to the serial bus control apparatus, and a node which includes the second register and the third register.

4. The serial bus control apparatus according to the claim 1 further comprising a register providing part for providing a register for reservation control table which table is accessible for reading and writing from an arbitrary node of an arbitrary bus of an N piece of serial buses having a same standard time.

5. The serial bus control apparatus according to the claim 2 further comprising a register providing part for providing a register for reservation control table which table is accessible for reading and writing from an arbitrary node of an arbitrary bus of an N piece of serial buses having a same standard time.

6. The serial bus control apparatus according to the claim 3 further comprising a register providing part for providing a register for reservation control table which table is accessible for reading and writing from an arbitrary node of an arbitrary bus of an N piece of serial buses having a same standard time.

* * * * *